UNITED STATES PATENT OFFICE.

ALBERT KISSEL, OF SALEM, ASSIGNOR TO THE ADAMANTA MANUFACTURING COMPANY, OF BOSTON, MASSACHUSETTS.

PROCESS OF HARDENING RESINS.

SPECIFICATION forming part of Letters Patent No. 441,366, dated November 25, 1890.

Application filed January 5, 1887. Serial No. 223,481. (No specimens.)

*To all whom it may concern:*

Be it known that I, ALBERT KISSEL, of Salem, county of Essex, and State of Massachusetts, have invented an Improvement in Resins and the Method of Preparing the Same, of which the following description in connection with the accompanying drawings is a specification, like letters on the drawings representing like parts.

This invention has for its object to purify and improve that class of resins which have been hardened by neutralizing the free resinous acid occurring in the resin in its natural state.

In the reissue patent, No. 10,714, dated April 20, 1886, I have disclosed a method of hardening inferior resins, such as colophony, by means of alkaline earths. The colophony or other inferior resin in its natural state may be melted or dissolved before adding the alkaline earth.

I have ascertained in the practical working of my improved hardened resin that when the resin is melted before adding the caustic alkaline earth a small amount of resinous acid is generated, or it might be said liberated, by the melting of the said hardened resin. The presence of this small amount of resinous acid might be detrimental in the various applications to which my improved hardened resin may be made, and to obviate this possible detriment I treat my improved hardened resin, preferably in a finely-powdered condition, with ammonia, or it may be with potash or soda or any other chemical capable of uniting with the resinous acid to form a soluble salt of resinous acid, which soluble salt may be subsequently washed out of the resin, leaving the latter neutral and perfectly free from resinous acid.

In order that my method of purifying hardened resins may be clearly comprehended, I will enumerate the various steps of the process to which the colophony or other inferior resin in its natural state is subjected.

A sample quantity of colophony—for instance, ten grams—is selected from a certain class or stock, and the amount of free acid in the ten grams is determined in any manner well known to chemists. The quantity of caustic lime or other alkaline earth necessary to neutralize the quantity of free acid in the ten grams is determined, and from this result the quantity of caustic lime necessary to neutralize the resinous acid in a larger or working quantity of resin—such, for instance, as five hundred pounds—may be easily determined. The working quantity of resin, say, the five hundred pounds, may be melted and the caustic lime added, and when so melted a small extra quantity of resinous acid is generated or liberated. To free the hardened resin from this extra quantity of resinous acid, I preferably reduce the hardened resin to a fine powder and add sufficient water containing about one per cent. of ammonia to form a pasty mass. I then boil this pasty mass for a short time—about five minutes—and separate the liquid from the resin by filtration, or in other suitable manner. The resin is then washed a number of times with pure water until the washings do not become turbid on the addition of lime-water. The resin, after being washed free from the soluble acid salt formed by the combination of the ammonia and the resin acid, is dried in any suitable manner. The resin thus treated is perfectly neutral and free from acid and is easily soluble in spirits of turpentine and other solvents.

I have herein mentioned resins which have been hardened with caustic alkaline earths in accordance with my reissue patent referred to, but I desire to include within the scope of my invention resins hardened by metallic oxides and other chemicals, wherein the resin is melted when the chemical is added to it.

I claim—

That improvement in the art or method of hardening colophony and like inferior resins which consists in, first, melting the resin with an oxide to neutralize the free resinous acid normally existing in the resin and forming a hardened resin; second, treating the hardened resin thus formed with a soluble chemical to convert resinous acid generated or liberated in melting the resin into a soluble salt, and, lastly, separating the soluble resinate thus formed from the hardened resin, substantially as described.

In testimony whereof I have signed my name to this specification in the presence of two subscribing witnesses.

ALBERT KISSEL.

Witnesses:
G. W. GREGORY,
J. H. CHURCHILL.